United States Patent [19]
Takahashi et al.

[11] Patent Number: 5,289,808
[45] Date of Patent: Mar. 1, 1994

[54] FUEL INJECTION DEVICE

[75] Inventors: Takanori Takahashi; Hisashi Kadowaki, both of Kariya, Japan

[73] Assignee: Nippondenso Co., Ltd., Kariya, Japan

[21] Appl. No.: 947,440

[22] Filed: Sep. 21, 1992

[30] Foreign Application Priority Data

Sep. 24, 1991 [JP] Japan .................. 3-273158

[51] Int. Cl.$^5$ .................................. F02D 43/04
[52] U.S. Cl. .................. 123/421; 123/486; 123/491
[58] Field of Search ............. 123/421, 491, 531–534, 123/478, 480, 486, 424, 406, 417

[56] References Cited

U.S. PATENT DOCUMENTS

| | | | |
|---|---|---|---|
| 4,532,902 | 8/1985 | Mizuno et al. | 123/417 |
| 5,121,716 | 6/1992 | Takahashi et al. | 123/531 |
| 5,148,788 | 9/1992 | Saikalis et al. | 123/478 |

FOREIGN PATENT DOCUMENTS 54-44821 3/1979 Japan .
55-9555 3/1980 Japan .
2-8144 2/1990 Japan .

Primary Examiner—Andrew M. Dolinar
Attorney, Agent, or Firm—Cushman, Darby & Cushman

[57] ABSTRACT

A fuel injection device increases an increment value of fuel after cut-off of assist air so that the air/fuel ratio for combustion can be held constant to stabilize the idling rotational speed. The device has control means for controlling, based on various detection signals indicative of an engine cooling water temperature, an engine rotational speed, an amount of intake air, etc., a valve-opening time of a fuel injection valve in accordance with a predetermined control program, and also controlling an on/off control valve for cutting off air supplied to fuel atomizing means. Fuel incrementing means increases an amount of liquid fuel supplied to the fuel injection valve depending on opening/closing of the on/off control valve and the temperature of engine cooling water. When the on/off control valve is closed and an engine is in a state of steady operation, the increment value of the liquid fuel supplied to the fuel injection valve can be gradually increased by the fuel incrementing means.

11 Claims, 8 Drawing Sheets

FUEL INJECTION DEVICE

BACKGROUND OF THE INVENTION

1. Field of the Invention

The present invention relates to a fuel injection device in which air is jetted out to liquid fuel injected through a fuel injection valve to accelerate atomization of the liquid fuel.

2. Description of the Prior Art

Several types of air-assisted fuel injection devices for accelerating atomization of liquid fuel are known. Japanese Utility Model Unexamined Publication No. 54-44821 discloses a device which is provided with a mixing chamber at the mount portion of a fuel injection valve, the mixing chamber being connected to a spring chamber of a pressure adjuster to modify a pressure of supplied fuel depending upon the pressure in the mixing chamber. Japanese Patent Publication No. 55-9555 discloses a device in which an air amount adjusting valve operated responsive to an engine temperature is disposed in an air bypass pipe associated with an intake manifold, the downstream end of the air bypass pipe is open in the vicinity of the air amount adjusting valve, and further the opening at the downstream end of the air bypass pipe has an effective sectional area smaller than that of the air bypass pipe in a portion downstream of the air amount adjusting valve. Additionally, Japanese Patent Publication No. 2-8144 discloses a device in which a modifying coefficient is determined based on a pressure essentially equal to the air pressure in an air introducing chamber, and the valve-opening time of a fuel injection valve is determined by the modifying coefficient to obtain an optimum amount of fuel injected at all times.

Particularly in the case of low-displacement engines or multi-cylinder engines, however, any of the above air-assisted fuel injection devices requires assist air to be reduced in amount or cut off during warm-up, because the amount of assist air bypassing a throttle valve becomes too much after the completion of warm-up and the idling rotational speed is so raised as not to maintain a predetermined rotational speed. But cut-off of the assist air causes a shift from the state that fuel is satisfactorily atomized with the aid of the assist air to the state that fuel is not sufficiently atomized, resulting in an increase of manifold wetting. The manifold wetting is increased particularly in cold weather and the fuel supplied to the engine becomes insufficient. As a result, the air/fuel ratio for combustion is fluctuated to produce a lean air/fuel ratio, giving rise to such a problem that the idling rotational speed is dropped down or disturbed (called rough idling) (see FIG. 11).

SUMMARY OF THE INVENTION

The present invention has been made with a view of solving the problem as mentioned above, and its object is to provide a fuel injection device in which after cut-off of assist air, the amount of fuel is increased to compensate for a reduction in the amount of fuel due to wetting of wall surfaces, so that the air/fuel ratio for combustion is held constant to stabilize the idling rotational speed.

As practical means for solving the above problem, there is provided a fuel injection device comprising, as shown in FIG. 1, a fuel injection valve 100, fuel atomizing means 101 for jetting out air to liquid fuel injected through said fuel injection valve 100 to atomize the liquid fuel, air supply means 104 provided with an on/-off control valve 103 for cutting off air supplied to said fuel atomizing means 101, control means 105 for receiving various detection signals indicative of an engine cooling water temperature, an engine rotational speed, an amount of intake air, etc., controlling a valve-opening time of said fuel injection valve in accordance with a predetermined control program, and also controlling said on/off control valve, and fuel incrementing means 106 for increasing an amount of the liquid fuel supplied to said fuel injection valve 100 depending on opening/-closing of said on/off control valve and said engine cooling water temperature.

The fuel incrementing means 106 may be of fuel incrementing means 106a for gradually increasing the increment value of the liquid fuel, when the on/off control valve 103 is closed and an engine is in a state of steady operation.

The fuel injection device thus arranged operates as follows. The control means 105 controls, based on the various detection signals indicative of an engine cooling water temperature, an engine rotational speed, an amount of intake air, etc., the valve-opening time of the fuel injection valve 100 in accordance with the predetermined control program, and also controls the on/off control valve 103 for cutting off air supplied to the fuel atomizing means 101. The fuel incrementing means 106 increases the amount of liquid fuel supplied to the fuel injection valve 100 depending on opening/closing of the on/off control valve 103 and the temperature of engine cooling water.

Also, when the on/off control valve 103 is closed and the engine is in a state of steady operation, the increment value of the liquid fuel supplied to the fuel injection valve 100 can be gradually increased by the fuel incrementing means 106a.

DETAILED DESCRIPTION OF THE PREFERRED EMBODIMENTS

Figure 1:
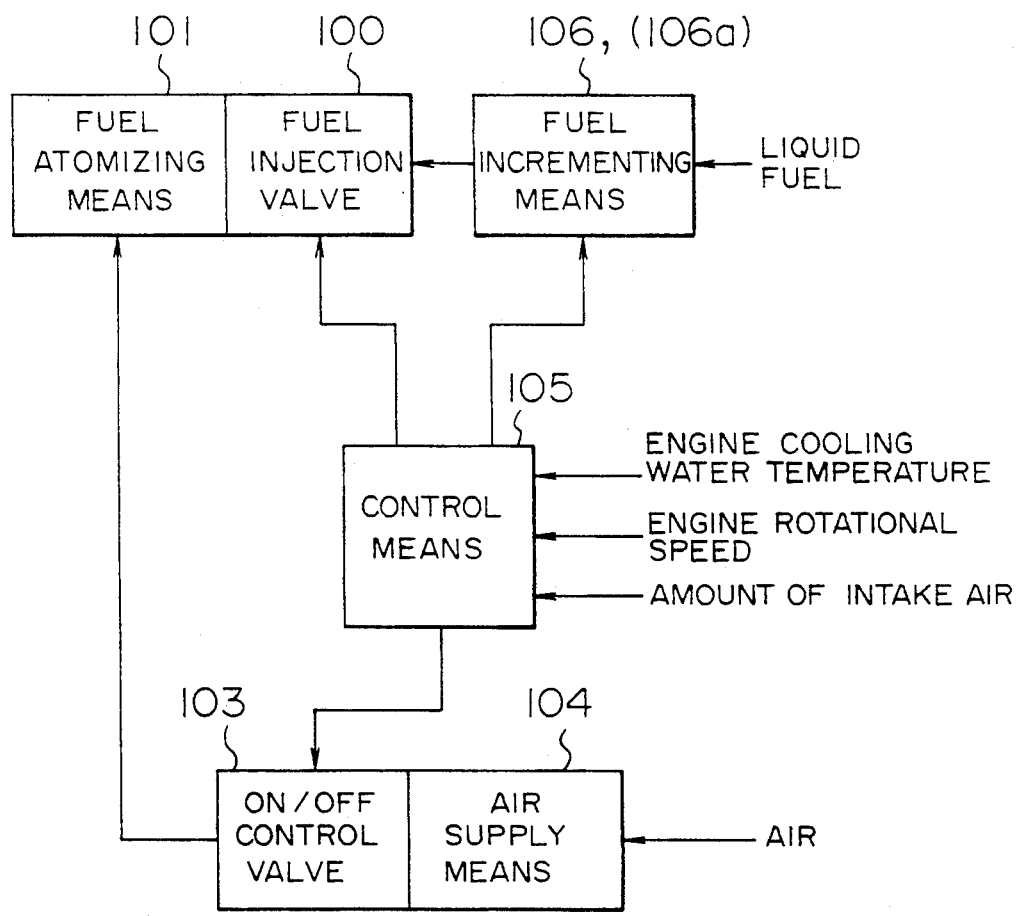
FIG. 1 is a conceptual view of a fuel injection device according to the present invention.
Figure 2:
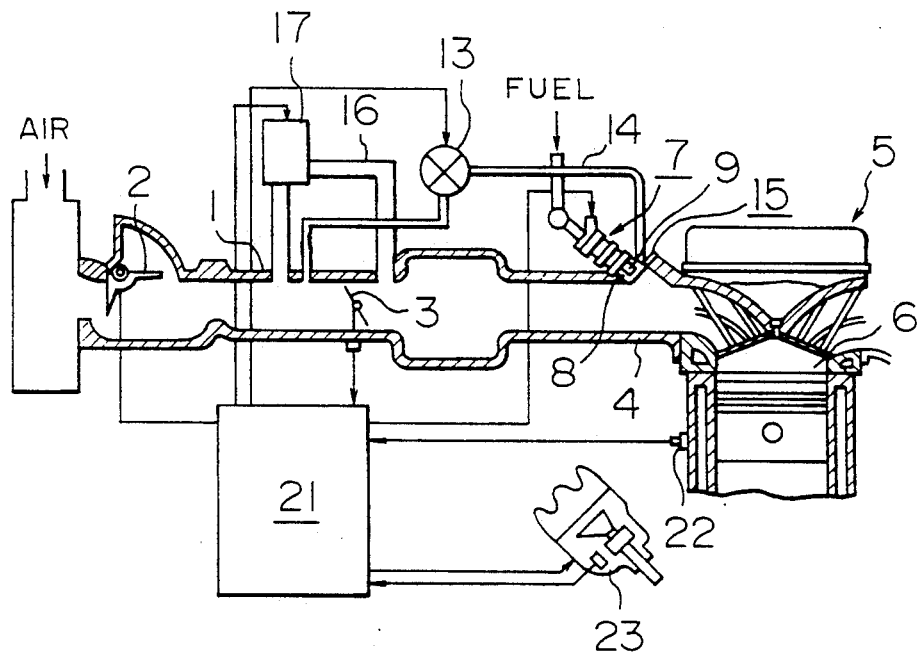
FIG. 2 is a schematic view showing a system configuration of the fuel injection device according to the present invention.

An embodiment of the present invention will be described below with reference to FIGS. 2 to 6 of the accompanying drawings. An intake pipe 1 is provided with an air flow meter 2 for measuring an amount of intake air and a throttle valve 3 for adjusting the amount of intake air in this order from the upstream side, and is communicated with a cylinder 6 of an engine 5 through an intake manifold 4 for each of engine cylinders. A fuel injection mechanism 7 is disposed in the intake manifold 4 downstream of the throttle valve 3. The fuel injection mechanism 7 includes an injector 9 having a distal end fixedly fitted to an air-assist holder 8 which is in turn secured to the intake manifold 4. Air jetted out through a plurality of air jetting holes 12 of an air supply mechanism 15 (described later) is mixed with liquid fuel injected to the intake manifold 4 through a fuel injection hole 10 of the injector 9 for thereby atomizing the liquid fuel.

Figure 3:
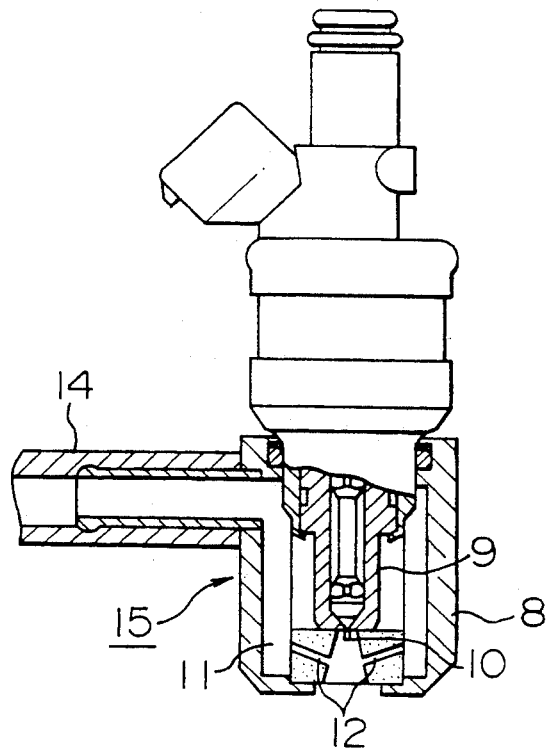
FIG. 3 is a sectional view showing an injector and an air supply mechanism in the device of FIG. 1.

In the air-assist holder 8, as shown in FIG. 3, an air introducing chamber 11 is formed around the distal end of the injector 9 and the plurality of air jetting holes 12 in communication with the air introducing chamber 11 are provided around the fuel injection hole 10 of the injector 9. Then, an air-assist bypass passage 14 which is bypassing the throttle valve 3 and has a solenoid on/off valve 13 disposed midway thereof is associated with intake pipe 1, the bypass passage 14 being coupled to the air-assist holder 8 to thereby constitute the air supply mechanism 15. The intake pipe 1 is further provided with another bypass passage 16 for idling rotational speed control (hereinafter referred to as ISC) which is also bypassing the throttle valve 3 and has an ISC valve 17 disposed midway thereof.

An electronic control unit (hereinafter referred to as an ECU) 21 comprises a CPU (not shown), various interfaces, memories such as ROM and RAM, an analog/digital converter, and so on. The ECU 21 detects and receives the amount of intake air measured by the air flow meter 2, a temperature of engine cooling water detected by an engine cooling water temperature sensor 22, an engine rotational speed determined from a distributor 23, and an on/off state of the throttle valve 3. In accordance with a control program stored in the memories beforehand, the ECU 21 executes arithmetic operations to control a valve-opening time for the fuel injection hole 10 and an on/off state of the solenoid on/off valve 13. The ECU 21 further outputs a control signal for the ISC valve 17 and an ignition timing control signal for the distributor 23.

Figure 4:
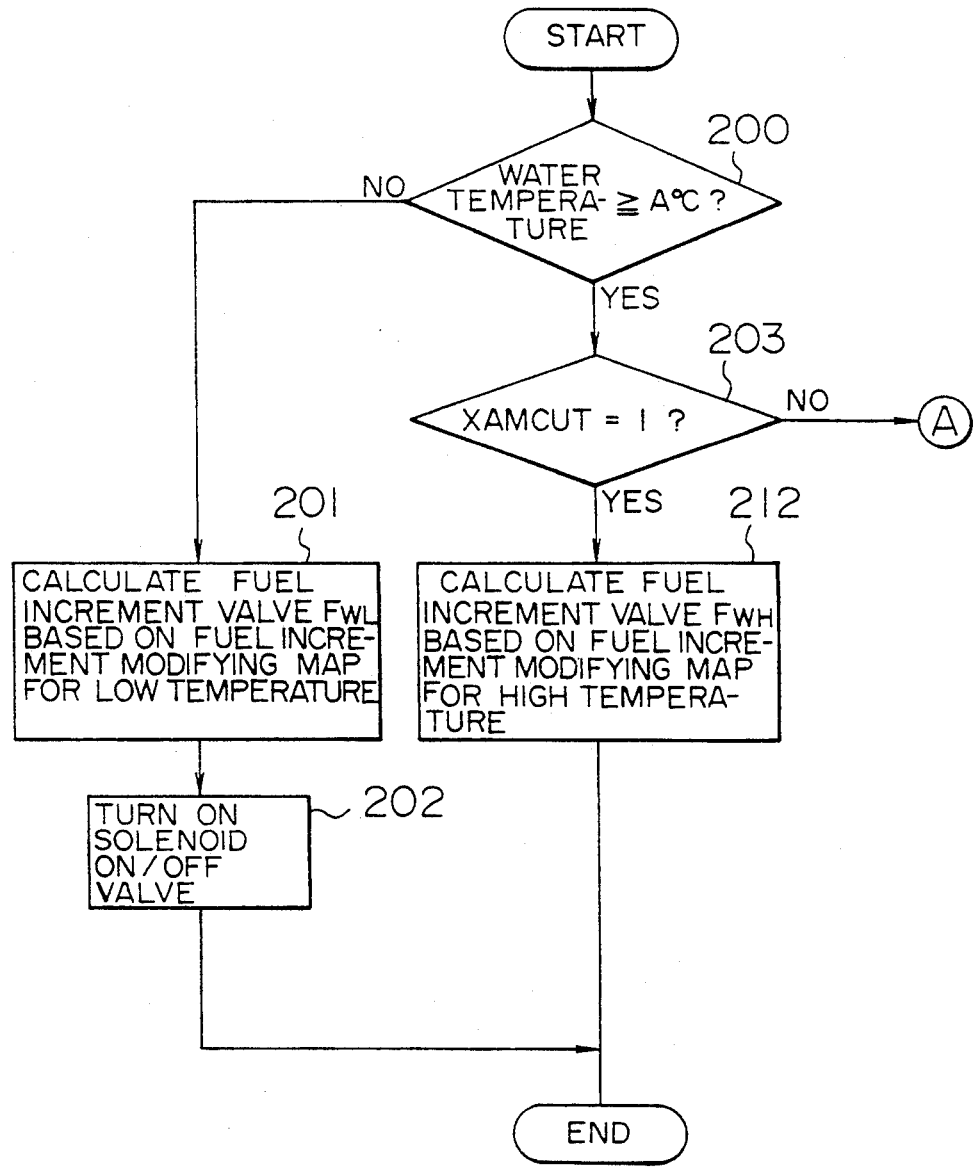
FIG. 4 is a flowchart showing steps 202–203 and a step 212 in one embodiment of injection amount control according to the present invention.
Figure 5:
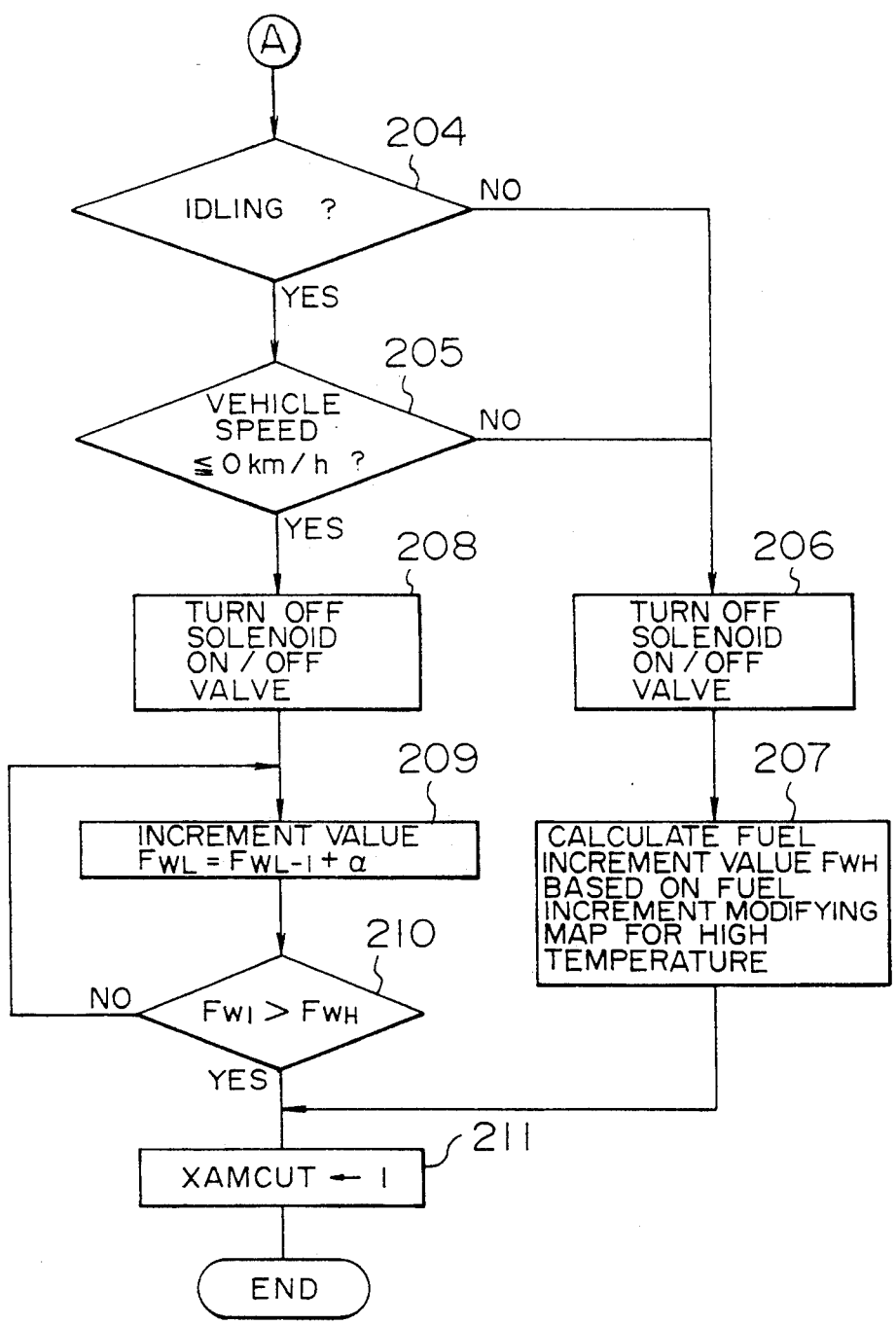
FIG. 5 is a flowchart showing steps 204–211 in one embodiment of the injection amount control.
Figure 6:
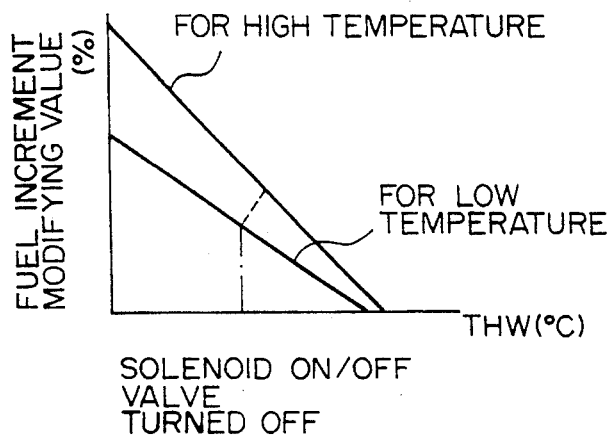
FIG. 6 is a map showing the relationship between a fuel increment modifying value and a temperature of engine cooling water.

Fuel injection control in the device of this embodiment thus constructed will be described with reference to flowcharts of FIGS. 4 and 5 and a fuel increment modifying map of FIG. 6. The fuel injection control is implemented through arithmetic operations executed by the CPU of the ECU 21. When the process is started, the CPU determines in a step 200 whether the water temperature detected by the engine cooling water temperature sensor 22 is not lower than a predetermined temperature. If lower than the predetermined temperature, then the process goes to a step 201 where a fuel increment modifying value corresponding to the detected water temperature is read from an fuel increment modifying map for low temperature to calculate a fuel increment value $Fw_L$. In a subsequent step 202, the solenoid on/off valve 13 is turned on to make the air-assist bypass passage 14 open, followed by ending the process.

If the temperature of the engine cooling water is not lower than the predetermined temperature in the above step 200, then the CPU determines in a next step 203 whether a flag XAMCUT indicating cut/off of the air-assist bypass passage 14 is set to "1" or not. In the first process after the temperature of the engine cooling water has become equal to or higher than the predetermined temperature, the decision in the above step 203 is "No" and the process goes to a step 204. The CPU determines in the step 204 whether the engine is under a state of idling operation or not. If the decision is "No", then the process goes to a step 206, while if "Yes", then it goes to a step 205. If the decision as to whether the vehicle speed is not higher than 0 km/h is "No", then the process goes to the step 206. The steps 204 and 205 are to determine whether the operating status of the engine is steady or not. If the decision in either one step is "No", then the operating status is determined to be not steady.

In the step 206, the solenoid on/off valve 13 is turned off to make the air-assist bypass passage 14 cut off. In a next step 207, the fuel increment modifying map (FIG. 6) is switched from one for low temperature to the other for high temperature, and a fuel increment modifying value corresponding to the temperature of the engine cooling water is read from the map to calculate a fuel increment value $Fw_H$. Subsequently, the process goes to a step 211 where the flag XAMCUT indicating that the solenoid on/off valve 13 is turned off to make the air-assist bypass passage 14 cut off is set to "1".

If the decisions in the steps 204 and 205 are both "Yes", meaning that the operating status is determined to be steady, then the process goes to a step 208 where the solenoid on/off valve 13 is turned off to make the air-assist bypass passage 14 cut off. In a next step 209, a fuel increment value $Fw_i$ is set to $Fw_i = Fw_{i-1} + \alpha$. The process then goes to a step 210 where the fuel increment value is gradually increased by a predetermined value $\alpha$ until it is determined that the fuel increment value $Fw_i$ exceeds above the fuel increment value $Fw_H$ calculated based on the fuel increment modifying value read from the fuel increment modifying map for high temperature. Thereafter, the process goes to the step 211 where the flag XAMCUT is set to "1".

In the second or subsequent process after the temperature of the engine cooling water has become equal to or higher than the predetermined temperature, since the flag XAMCUT is already set to "1", the process goes to a step 212 where a fuel increment modifying value corresponding to the temperature of the engine cooling water is read from the fuel increment modifying map to calculate a fuel increment value $Fw_H$, followed by ending the process.

As stated above, when the operating status of the engine is not steady, the solenoid on/off valve 13 is turned off to make the air-assist bypass passage 14 cut off (in the step 206), following which the fuel increment modifying map is switched from one for low temperature to the other for high temperature, and a fuel increment modifying value corresponding to the temperature of the engine cooling water is read from the map to calculate a fuel increment value $Fw_H$ (in the step 207). The reason of executing such a process is as follows. When the supply of assist air is cut off, mixing of fuel with air is deteriorated and so is the condition of combustion. Therefore, unless the larger amount of fuel than that in the air-assisted state is supplied, the same engine power could not be achieved. Also, atomization of fuel is so deteriorated that the fuel adhering to the inner wall of the intake manifold 4 is increased and the fuel actually sucked into the cylinder 6 for combustion is decreased. It is thus required to compensate for a reduction in the amount of fuel actually contributing to the combustion. With the fuel incrementing process explained above, the wall surface wetting of fuel after cut-off of the assist air is compensated for to keep the air/fuel ratio for combustion constant, thereby stabilizing the idling rotational speed.

Figure 7:
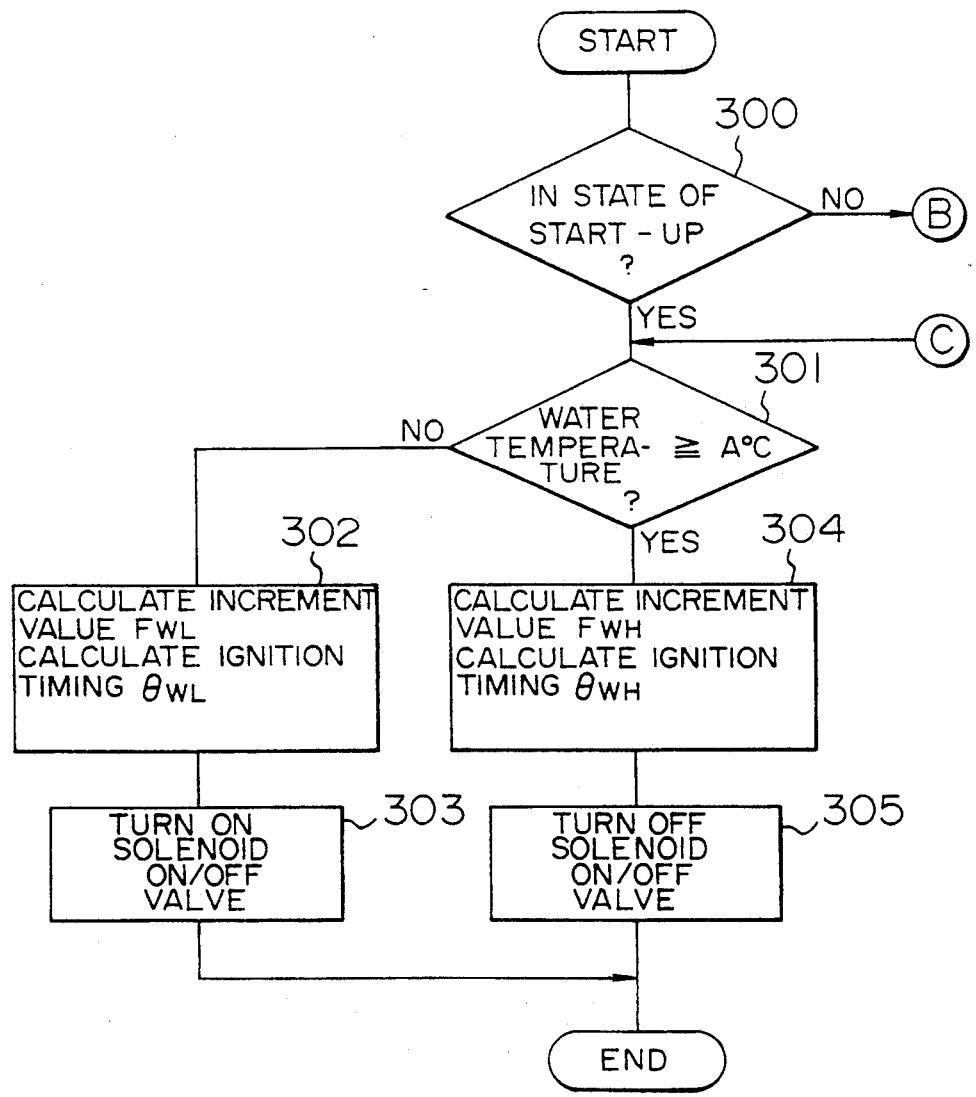
FIG. 7 is a flowchart showing steps prior to a step 305 in another embodiment of the injection amount control.
Figure 8:
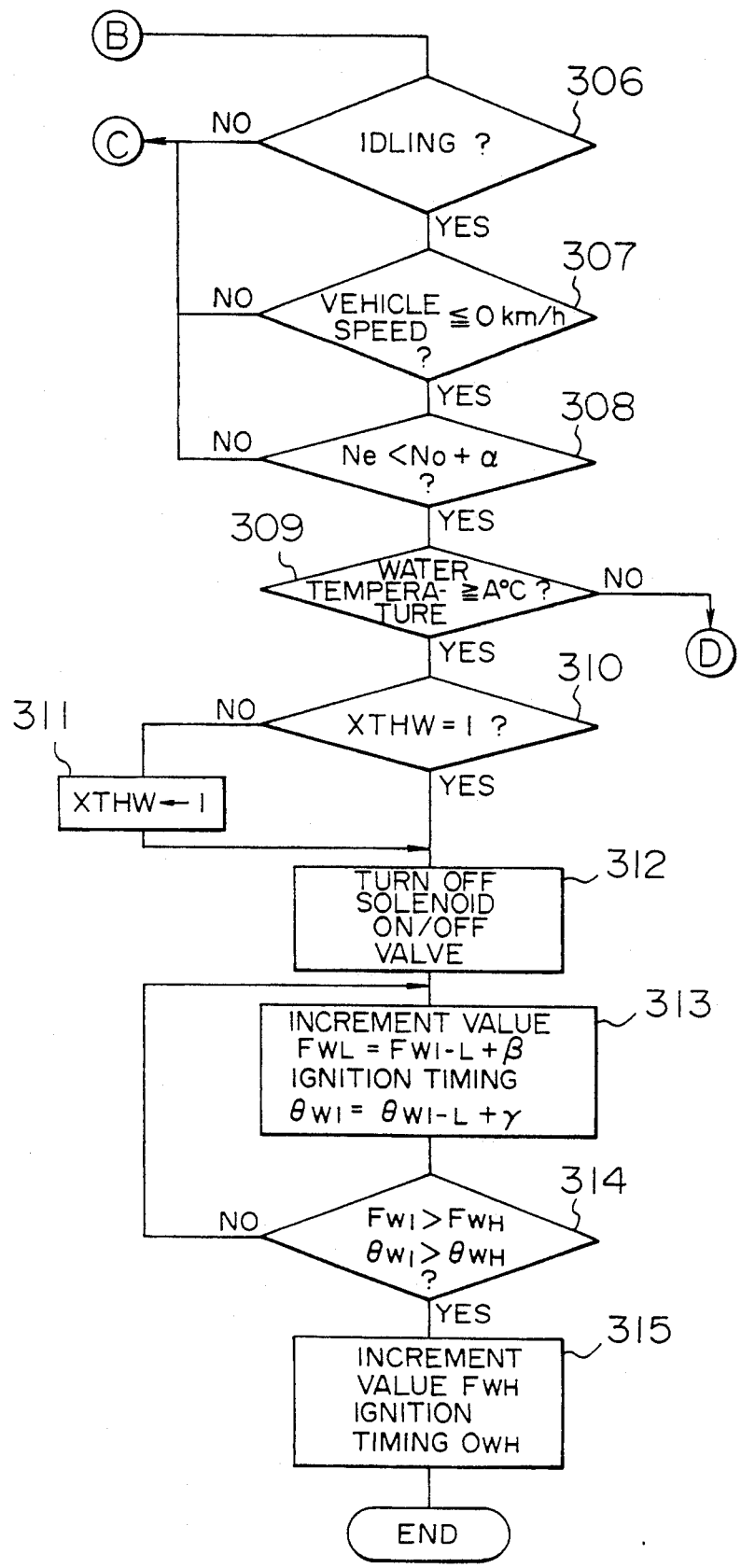
FIG. 8 is a flowchart showing steps 306–315 in another embodiment of the injection amount control.
Figure 9:
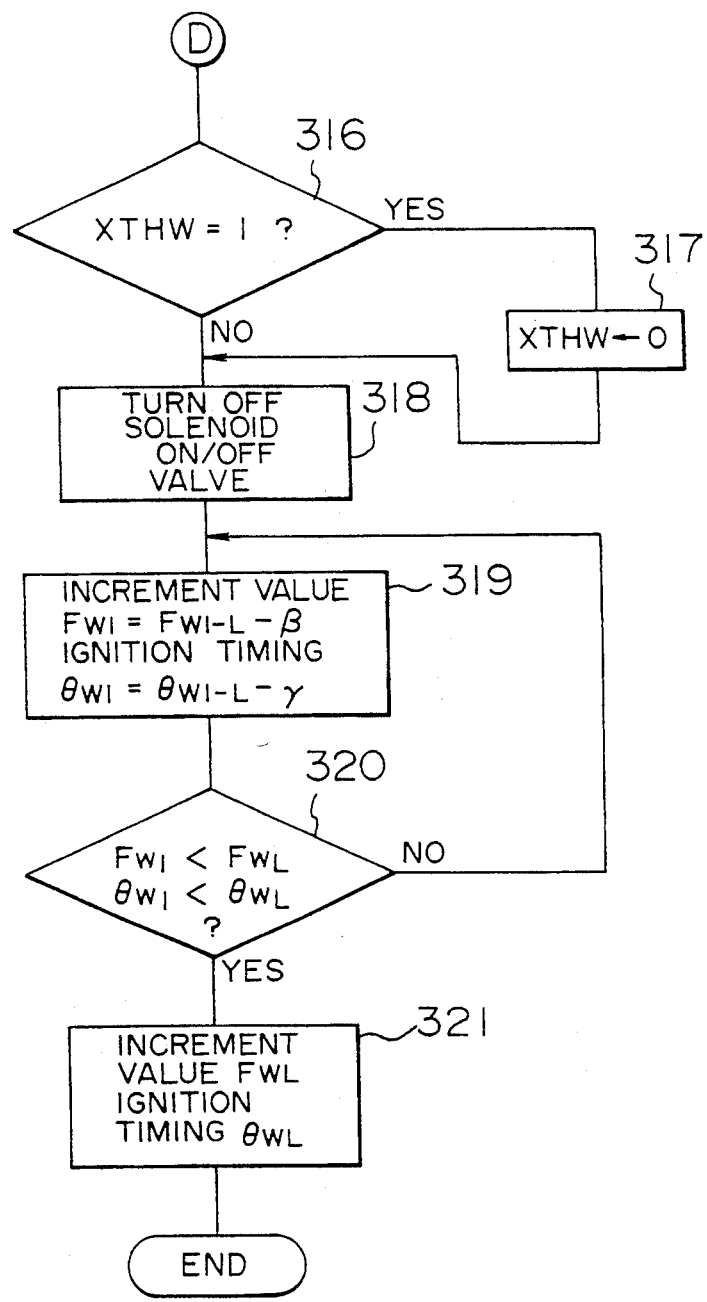
FIG. 9 is a flowchart showing steps subsequent to a step 316 in another embodiment of the injection amount control.
Figure 10:
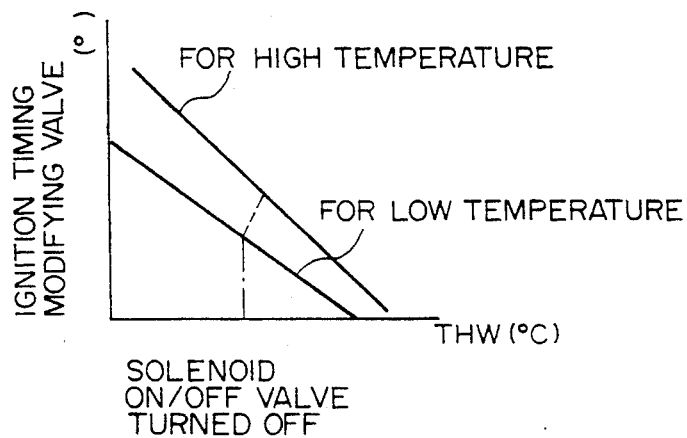
FIG. 10 is a map showing the relationship between an ignition timing modifying value and a temperature of engine cooling water.
Figure 11:
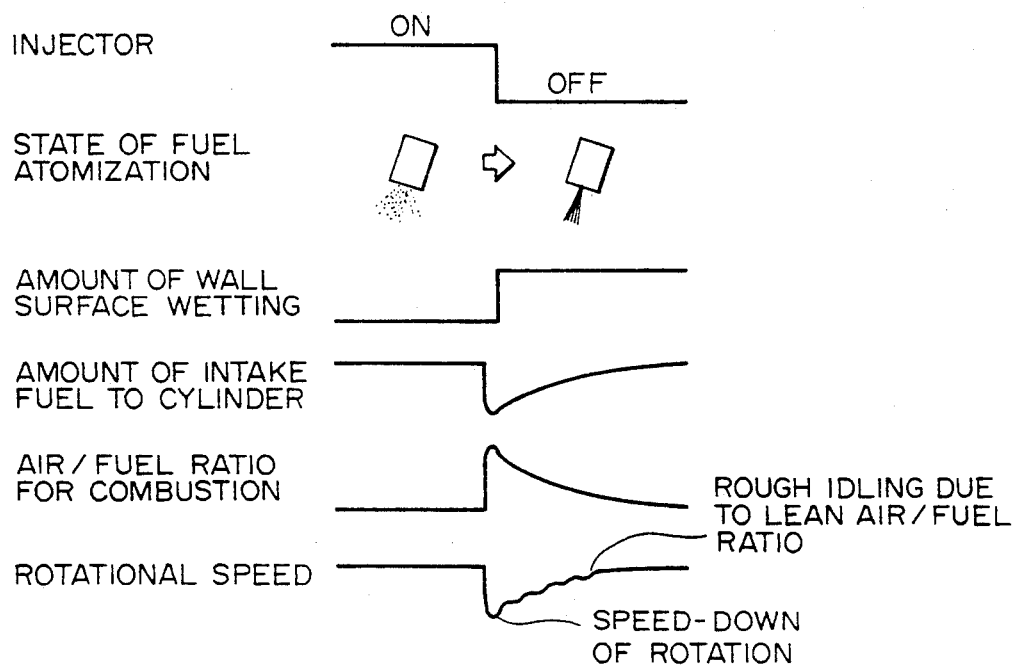
FIG. 11 is a timing chart when an air assist passage is cut off.

FIGS. 7 to 9 are flowcharts showing contents of a control process of another embodiment. This embodiment is arranged to turn on or off the solenoid on/off valve 13 depending on the temperature of the engine cooling water for increasing or decreasing the amount of fuel supplied to the fuel injection mechanism and also advancing or retarding the ignition timing. When the process is started, the CPU determines in a step 300 whether the engine is under a start-up condition or not. If under a start-up condition, then the CPU determines in a step 301 whether the water temperature detected by the engine cooling water temperature sensor 22 is not lower than a predetermined temperature. If lower than the predetermined temperature, then the process goes to a step 302 where a fuel increment modifying value and an ignition timing modifying value corresponding to the detected water temperature are read from the fuel increment modifying map for low temperature and an ignition timing modifying map for low temperature (FIG. 10), respectively, to calculate a fuel increment value $Fw_L$ and an ignition timing $\theta w_L$. In a subsequent step 303, the solenoid on/off valve 13 is turned on to make the air-assist bypass passage 14 open, followed by ending the process.

If the temperature of the engine cooling water is not lower than the predetermined temperature in the above step 301, then a fuel increment modifying value and an ignition timing modifying value corresponding to the detected water temperature are read from the fuel increment modifying map for high temperature and an ignition timing modifying map for high temperature, respectively, to calculate a fuel increment value $Fw_H$ and an ignition timing $\theta w_H$ in a next step 305. In a subsequent step 305, the solenoid on/off valve 13 is turned off to make the air-assist bypass passage 14 cut off, followed by ending the process. Further, if the engine is not under a start-up condition as a result of the decision in the above step 300, then the process goes to steps 306-308 for determining whether the engine operating status is steady or not. Specifically, the CPU determines in the step 306 whether the engine is under a state of idling operation or not, in the step 307 whether the vehicle speed is not higher than 0 km/h, and further in the step 308 whether the engine rotational speed Ne is lower than an upper limit $No+\alpha$ of the target rotational speed or not.

If the decision in any one of the steps 306, 307 and 308 is "No", then the operating status of the engine is determined to be not steady, followed by going to the above step 301. If the operating status is steady, then the process goes to a step 309 for determining whether the temperature of the engine cooling water is not lower than the predetermined temperature. If not lower than the predetermined temperature, then the CPU determines in a step 310 whether a flag XTHW indicating that fact is set to "1" or not. If not set, then the flag XTHW is set to "1" in a step 311, followed by going to a step 312 where the solenoid on/off valve 13 is turned off to make the air-assist bypass passage 14 cut off.

In a next step 313, a fuel increment value $Fw_i$ is set to $Fw_i = Fw_{i-1} + \beta$. Thus, the fuel increment value is gradually increased by a predetermined value $\beta$ until it is determined in a step 314 that the fuel increment value $Fw_i$ exceeds above the fuel increment value $Fw_H$ calculated based on the fuel increment modifying value read from the fuel increment modifying map for high temperature depending on the temperature of the engine cooling water. At the same time, an ignition timing $\theta w_i$ is set to $\theta w_i = \beta w_{i-1} + \gamma$. Thus, the ignition timing is gradually advanced by a predetermined value $\gamma$ until it is determined in the step 314 that the ignition timing $\theta w_i$ goes ahead of the ignition timing $\theta w_H$ read from the ignition timing modifying map for high temperature depending on the temperature of the engine cooling water. Thereafter, the process is ended by setting the above fuel increment value $Fw_H$ as a fuel increment value for high temperature and the above ignition timing $\theta w_H$ as an ignition timing for high temperature, respectively, in a step 315.

If the temperature of the engine cooling water is determined in the above step 309 to be lower than the predetermined temperature, then the process goes to a step 316 for determining whether the flag XTHW indicating that the temperature of the engine cooling water is not lower than the predetermined temperature is set to "1". If set, then the flag XTHW is reset to "0" in a step 317. Thereafter, the solenoid on/off valve 13 is turned on a step 318 to make the air-assist bypass passage 14 open so that the assist air is supplied.

In a next step 319, the fuel increment value $Fw_i$ is set to $Fw_i = Fw_{i-1} - \beta$. Thus, the fuel increment value is gradually decreased by a predetermined value $\beta$ until it is determined in a step 320 that the fuel increment value $Fw_i$ exceeds below the fuel increment value $Fw_L$ calculated based on the fuel increment modifying value read from the fuel increment modifying map for low temperature depending on the temperature of the engine cooling water. At the same time, the ignition timing $\theta w_i$ is set to $\theta w_i = \beta w_{i-1} - \gamma$. Thus, the ignition timing is gradually retarded by a predetermined decrement of $\gamma$ until it is determined in the step 320 that the ignition timing $\theta w_i$ is behind the ignition timing $\theta w_H$ read from the ignition timing modifying map for low temperature depending on the temperature of the engine cooling water. Thereafter, the process is ended by setting the above fuel increment value $Fw_L$ as a fuel increment value for low temperature and the above ignition timing $\theta w_L$ as an ignition timing for low temperature, respectively, in a step 321.

In another embodiment explained above, the solenoid on/off valve 13 is turned on or off to make the air-assist bypass passage 14 open or cut off depending on the temperature of the engine cooling water for increasing or decreasing the amount of fuel and, simultaneously, the ignition timing is advanced or retarded. As a result, not only the air/fuel ratio for combustion is kept constant, but also the ignition timing is adjusted to an optimum timing. Idling with smooth rotation can be thus realized free from drop-down or disturbance of the rotational speed.

As described above, since the present invention is arranged to increase the amount of liquid fuel supplied to a fuel injection valve depending on opening/closing of an on/off control valve for cutting off air supplied to fuel atomizing means and the temperature of engine cooling water, it is possible to prevent speed down of rotation, rough idling, deterioration in emissions, etc. otherwise caused by fluctuations of the air/fuel ratio for combustion. Another advantage is in that when the on/off control valve is closed and the engine is in a state of steady operation, an increment value of the liquid fuel supplied to the fuel injection valve is gradually increased to prevent the rotational speed from abrupt fluctuating during the steady operation.

What is claimed is:

1. A fuel injection device comprising:
 a fuel injection valve,
 fuel atomizing means for jetting out air to liquid fuel injected through said fuel injection valve to atomize the liquid fuel,
 air supply means provided with an on/off control valve for cutting off air supplied to said fuel atomizing means,
 control means for receiving various detection signals indicative of an engine cooling water temperature, an engine rotational speed, an amount of intake air, etc., controlling a valve-opening time of said fuel injection valve in accordance with a predetermined control program, and also controlling said on/off control valve, and
 fuel incrementing means for increasing an amount of the liquid fuel injected through said fuel injection valve by a value which is determined based on said engine cooling water temperature, when said on/off control valve is operated from an open state to a closed state to cut off the air supplied to said fuel atomizing means.

2. A fuel injection device according to claim 1, wherein said fuel incrementing means includes means for gradually increasing an increment value of the liquid fuel until an amount which is determined based on said engine cooling water temperature, when said on/off control valve is closed and an engine is under predetermined operating status.

3. A fuel injection device according to claim 2, wherein said on/off control valve is closed when said engine cooling water temperature becomes equal to or higher than a predetermined value.

4. A fuel injection device according to claim 2, wherein said fuel incrementing means includes means for gradually decreasing the increment value of the liquid fuel by a predetermined value, when said on/off control valve is operated from the closed state to the open state.

5. A fuel injection device according to claim 4, further comprising means for gradually retarding an ignition timing of said engine by a predetermined value, when said on/off control valve is operated from the closed state to the open state.

6. A fuel injection device according to claim 5, further comprising means for gradually advancing the ignition timing of said engine by a predetermined value, when said on/off control valve is operated from the open state to the closed state.

7. A fuel injection device for injecting liquid fuel through a fuel injection valve provided on an intake pipe of an engine, said device comprising:
 fuel atomizing means for jetting out air to the liquid fuel injected through said fuel injection valve to atomize the liquid fuel,
 air supply means provided with an on/off control valve for cutting off air supplied to said fuel atomizing means,
 control means for receiving various detection signals indicative of an engine cooling water temperature, an engine rotational speed, an amount of intake air, etc., controlling a valve-opening time of said fuel injection valve in accordance with a predetermined control program, and also controlling said on/off control valve, and
 fuel incrementing means for increasing an amount of the liquid fuel injected through said fuel injection valve, when said on/off control valve is operated from an open state to a closed state to cut off the air supplied to said fuel atomizing means.

8. A fuel injection device for injecting liquid fuel through a fuel injection valve provided on an intake pipe of an engine, said device comprising:
 fuel atomizing means for jetting out air to the liquid fuel injected through said fuel injection valve to atomize the liquid fuel,
 air supply means provided with an on/off control valve for cutting off air supplied to said fuel atomizing means,
 control means for receiving various detection signals indicative of an engine cooling water temperature, an engine rotational speed, an amount of intake air, etc., controlling a valve-opening time of said fuel injection valve in accordance with a predetermined control program, and also controlling said on/off control valve, and
 a fuel increment modifying value map for low temperature with which an increment value of the liquid fuel injected through said fuel injection valve is reduced depending on said engine cooling water temperature to become smaller at the higher engine cooling water temperature, and a fuel increment modifying value map for high temperature in which said increment value of the liquid fuel is set larger than that in said fuel increment modifying value map for low temperature, and
 fuel increment control means for selecting said fuel increment modifying value map for low temperature when said on/off control valve is open, and selecting said fuel increment modifying value map for high temperature when said on/off control valve is closed, thereby controlling said increment value of the liquid fuel injected through said fuel injection valve.

9. A fuel injection device according to claim 8, wherein said fuel increment control means includes means for gradually changing said modifying value when said fuel increment modifying value map is switched from one to the other.

10. A fuel injection device according to claim 8, wherein said on/off control valve is closed when said on/off control valve is closed when said engine cooling water temperature becomes equal to or higher than a predetermined value.

11. A fuel injection device according to claim 10, further comprising:
 an ignition timing modifying value map for low temperature with which an ignition timing modifying value to advance an ignition timing is reduced depending on said engine cooling water temperature to become smaller at the higher engine cooling water temperature, and an ignition timing modifying value map for high temperature in which said ignition timing modifying value to advance the ignition timing is set larger than that in said ignition timing modifying value map for low temperature, and ignition timing control means for selecting said ignition timing modifying value map for low temperature when said on/off control valve is open, and selecting said ignition timing modifying value map for high temperature when said on/off control valve is closed, thereby controlling said ignition timing modifying value of an engine.

* * * * *